United States Patent
Iellimo

(10) Patent No.: US 11,084,667 B2
(45) Date of Patent: Aug. 10, 2021

(54) LANE DIVIDER INSERT SLEEVE

(71) Applicant: FRAZIER INDUSTRIAL COMPANY, Long Valley, NJ (US)

(72) Inventor: Domenick Iellimo, Forked River, NJ (US)

(73) Assignee: FRAZIER INDUSTRIAL COMPANY, Long Valley, NJ (US)

( * ) Notice: Subject to any disclaimer, the term of this patent is extended or adjusted under 35 U.S.C. 154(b) by 0 days.

(21) Appl. No.: 16/707,376

(22) Filed: Dec. 9, 2019

(65) Prior Publication Data

US 2021/0171293 A1     Jun. 10, 2021

(51) Int. Cl.
*B65G 47/71* (2006.01)
*B65G 13/12* (2006.01)

(52) U.S. Cl.
CPC .......... *B65G 47/71* (2013.01); *B65G 13/12* (2013.01)

(58) Field of Classification Search
None
See application file for complete search history.

(56) References Cited

U.S. PATENT DOCUMENTS

| | | | | |
|---|---|---|---|---|
| 2,143,818 A | * | 1/1939 | Morrissey | F16B 7/0413 403/164 |
| 4,759,097 A | * | 7/1988 | Black | B60B 33/0002 16/18 CG |
| 6,073,743 A | * | 6/2000 | Mefford | B65G 1/023 193/35 R |
| 7,815,060 B2 | | 10/2010 | Iellimo | |

\* cited by examiner

*Primary Examiner* — William R Harp
(74) *Attorney, Agent, or Firm* — Dilworth & Barrese, LLP

(57) ABSTRACT

A lane divider system includes a guide rail and a bracket for connecting the guide rail to a flow bed. The guide rail can be tubular, with a proximal end of a bracket inserted into each end of the tube. A flexible, compressible sleeve can be installed at each end of the tube where the proximal end of the bracket, are inserted into the tube. The tube and bracket being inserted should be closely dimensioned to fit securely. By providing a compliant sleeve, the security of the connection with the tube can be enhanced.

20 Claims, 6 Drawing Sheets

LANE DIVIDER INSERT SLEEVE

BACKGROUND

The invention relates generally to container flow systems, wherein cases, cartons, totes or other types of containers are moved (flow) through warehouses and the like on beds of rollers, and more particularly to container flow systems with adjustable lane dividers wherein a tubular lane barrier couples to a lane dividing bracket.

Container flow systems are typically employed by distributors and others in warehouses or other facilities for managing the inflow, transport and outflow of containers (cases) of merchandise or other inventory from manufacturers to retailers and otherwise. Container flow structures are typically equipped with low friction transportation bed, such as a roller bed, which includes a plurality of wheels, balls, or other rollers, mounted on axles and supported by a pair of side rails. Container flow roller beds are typically inclined. Thus, the cases, cartons, totes or other types of containers can be loaded onto the loading end and are permitted to "flow" towards the unloading end under the force of gravity. The containers can be retrieved from the unloading end of the flow bed.

One example of a container flow system is described in U.S. Pat. No. 6,073,743, the entire contents of which are incorporated herein by reference. The container flow system comprises a roller bed equipped with a plurality of independently rolling wheels, in a spaced relationship, along a set of axles, which are mounted on a pair of side rails. A plurality of inverted generally U-shaped support members extend from the rear to the front of each bed and are located adjacent to the wheels. The support members rest on and transfer the load to cross beams underneath the support members. The load taken by the supports helps reduce the load on the axles.

One disadvantage of conventional container flow bed systems relates to the precise lateral location of the containers as they travel down the bed, so that they arrive at a precise desired location at the unloading end. For example, errors can occur if the containers are placed on a specific location of the loading end and shift laterally with respect to the flow direction while flowing to the unloading end.

Another example of a container flow system is disclosed in U.S. Pat. No. 7,815,060, the entire contents of which are incorporated herein by reference. Lane dividers are disclosed to increase the accuracy of the position of the containers. The dividers include an upstream end, which are inserted into a loading end section of the bed and a downstream end, inserted into the unloading end of a bed section. Guide rails can also be provided from the loading end to the unloading end to prevent the containers from drifting laterally as they flow downstream.

Guide rails can be long, extending for tens of feet in length. Containers moving through the lanes can be heavy. Accordingly, substantial force can be exerted against the guide rails. This can undesirably cause them to dislodge from their position on the flow bed. This can interrupt the orderly flow of containers and can result in improper positioning of containers at the unloading end of the bed. This can lead to mishandling and mis-storing of merchandise.

Accordingly, it is desirable to provide an improved system for guiding containers on a container flow bed, that overcomes disadvantages of existing systems.

SUMMARY OF THE INVENTION

Generally speaking, in accordance with the invention, in improved container flow bed is provided for the handling of containers. A container flow bed in accordance with an embodiment of the invention can include a loading end, an unloading end and a container flow direction from the loading end to the unloading end. Container flow beds in accordance with the invention can also include lane dividers, which can extend from a loading end to an unloading end of at least a section of the flow bed. The lane dividers are preferably adjustable in a widthwise direction, perpendicular to the flow direction, to provide for adjustable lane width. The lane dividers are preferably releasably secured to the loading end and/or to the unloading end with a releasable retention device.

A lane divider can comprise a guide rail coupled to a bracket at each end for connecting the guide rail to the flow bed. The guide rails can be tubular, with a proximal end of the bracket inserted into an end of the tube. Alternatively, the brackets can be tubular and an end of the guide rail can be inserted into the proximal end of the bracket. A sleeve can be installed at the end of the guide rail tube where the proximal end of the bracket is inserted into the tube. Alternatively, a cap can be installed at the end of the bracket that inserts into the tube end. The tube and bracket being inserted should be closely dimensioned. By providing a compliant sleeve or end cap, the security of the connection with the tube can be increased. Safety can also be increased.

The sleeve (or end cap) on the bracket can be formed from different pliable materials, such as rubber, flexible plastics and other pliable polymeric/elastomeric materials, such as nylon, and composites such as ethyl vinyl acetate (EVA). The sleeve or end cap should be resistant to cracking as the end is inserted and withdrawn. It should also be compressible, to account for imperfect dimensions and to enhance gripping strength.

Retention devices for releasably securing the proximal and/or distal ends of the lane divider brackets to the loading and unloading ends of the flow bed can include a pin, inserted through an opening in the distal or proximal end of the lane divider where the lane divider is coupled to the flow bed. Preferred pins can include a handle portion, such as a ring, bar, or enlarged head for inserting and pulling the pin out of the opening in the end of the lane divider. Preferred pins can also include a locking structure, such as a split cotter pin, resilient projection, spring clip and the like, to resist the unintentional withdrawal of the pin from the end of the lane divider.

In one embodiment of the invention, the proximal and/or distal ends of the lane dividers are noncircular. The distal noncircular ends can be inserted through matching noncircular openings at the loading and/or unloading ends of the flow bed. Alternatively, the loading and/or unloading ends of the flow bed can include noncircular projections that can be inserted through matching noncircular openings at the distal ends of the lane dividers.

In one embodiment of the invention, the loading and/or unloading ends of the flow bed comprise a first row of a plurality of noncircular apertures (or projections), extending in the width direction perpendicular to the flow direction. In another embodiment of the invention, a second row of noncircular apertures is arranged directly under the first row. The ends of the lane dividers can extend through top and preferably both the top and bottom apertures, to provide two locations of anti-rotational resistance. In each of these embodiments, the ends of the lane divider should be releasably secured against withdrawal. A removable pin can help keep the bracket in place.

In another embodiment of the invention, the lane dividers include loading end and/or unloading end lane divider brackets. These lane divider brackets preferably comprise a single piece member, preferably formed from a metal such as steel. The brackets preferably include a vertical distal end portion for engaging with the flow bed, an angled middle portion extending at an obtuse (preferably) angle from the vertical portion, and a horizontal connection proximal end portion. The horizontal connection portion is adapted to be coupled to a lane divider guide rail.

The lane divider guide rails can take the form of an elongated horizontal member, such as a tube, pipe or bar, for preventing the containers from shifting from side to side, in the width direction, as they travel in the flow direction along the flow bed. A flexible sleeve is preferably installed at the end of the tube or pipe to protect the end and to promote a stronger, more secure connection. In one embodiment of the invention, the lane divider body can take the form of a circular or noncircular tube, having a sleeve at its end, which compliantly fits over the connection portion of the bracket. Alternatively, the proximal end of the bracket can have a soft end cap. The guide rail can also be inserted into the horizontal connection portion of the bracket and the sleeve will be installed on the connection portion of the bracket.

In one embodiment of the invention, the vertical distal end portion of the lane divider bracket is noncircular, fits into or over a corresponding portion of the loading and/or unloading end of the flow bed, and thereby provides the lane divider bracket with resistance to lateral rotation. The free end of the vertical end portion is preferably provided with an opening. A locking pin can be inserted through that opening and the locking pin can be further secured against inadvertent withdrawal from the opening. Other security devices which resist removal of the bracket from the loading and/or unloading end of the flow bed can also be helpful in accomplishing objects of the invention.

Other objects and advantages of the invention will be apparent from the specification and drawings.

BRIEF DESCRIPTION OF THE DRAWINGS

The figures are intended to be illustrative and are not intended to limit the scope of the invention. Identical reference numerals are assigned to similar structures. The dimensions are not necessarily to scale.

DETAILED DESCRIPTION OF THE PREFERRED EMBODIMENTS

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

The terms "merchandise," "inventory," "cases," "cartons," "boxes," and "containers" are used interchangeably herein. The flow system described herein can facilitate the management and movement of inventory in a warehouse or other facility in which articles, containers and so forth are sorted and transferred from place to place. Typically, the inventory is contained in cartons and loaded onto pallets. Flow beds in accordance with the invention can be used in warehouses to sort articles such as cartons, totes, and other containers for delivery or storage. Incoming containers are placed at the loading end of the flow bed, which can be angled slightly downward. The containers can then roll by the force of gravity in a flow direction to the unloading end of the bed, where they can be picked up for delivery or storage. While the flow beds described herein advantageously use rollovers to facilitate the flow direction movement of the containers, other mechanisms, such as low friction sliding surfaces and air, water or magnetic levitation mechanisms can be used.

Flow beds in accordance with the invention can be constructed in multiple sections or as one long section. Lane dividers in accordance with the invention can extend from the loading end of a bed to the unloading end of the bed or for only one section of a bed. Multiple lane dividers can be used in the series, from the loading end the unloading end.

Figure 1:
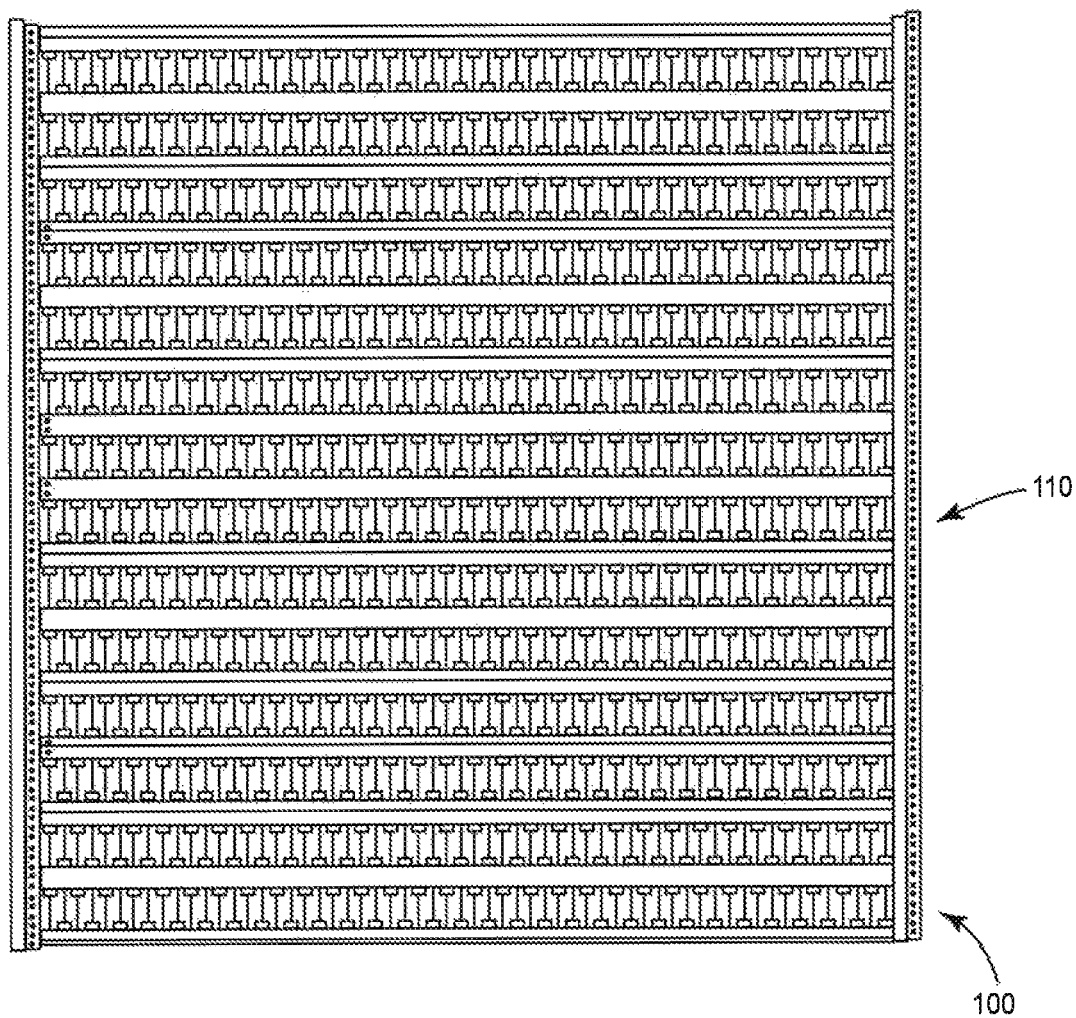
FIG. 1 is a top plan view of a container flow bed, in accordance with an embodiment of the invention.
Figure 2:
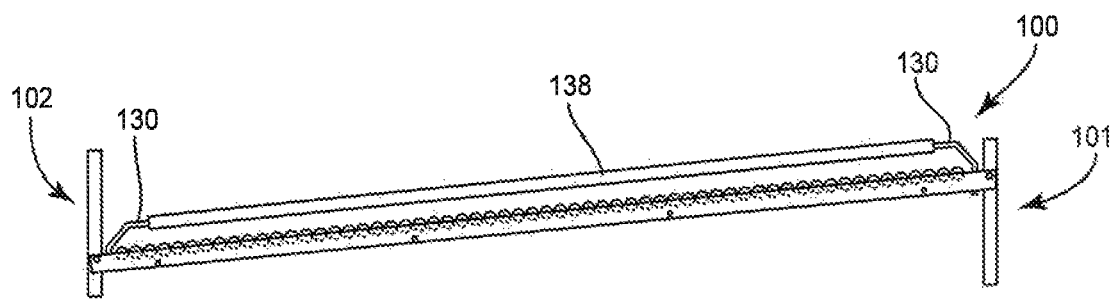
FIG. 2 is a side view of the flow bed of FIG. 1.

Referring generally to FIG. 1, a container flow bed 100 in accordance with the invention can include one or more bed sections 110, arranged side-by-side or end to end. As shown in FIG. 2, case flow bed 100 is angled downward from a loading end 101 to an unloading end 102. The pitch of bed 100 can be about 1 inch per foot or otherwise, at the option of the designer.

Figure 3:
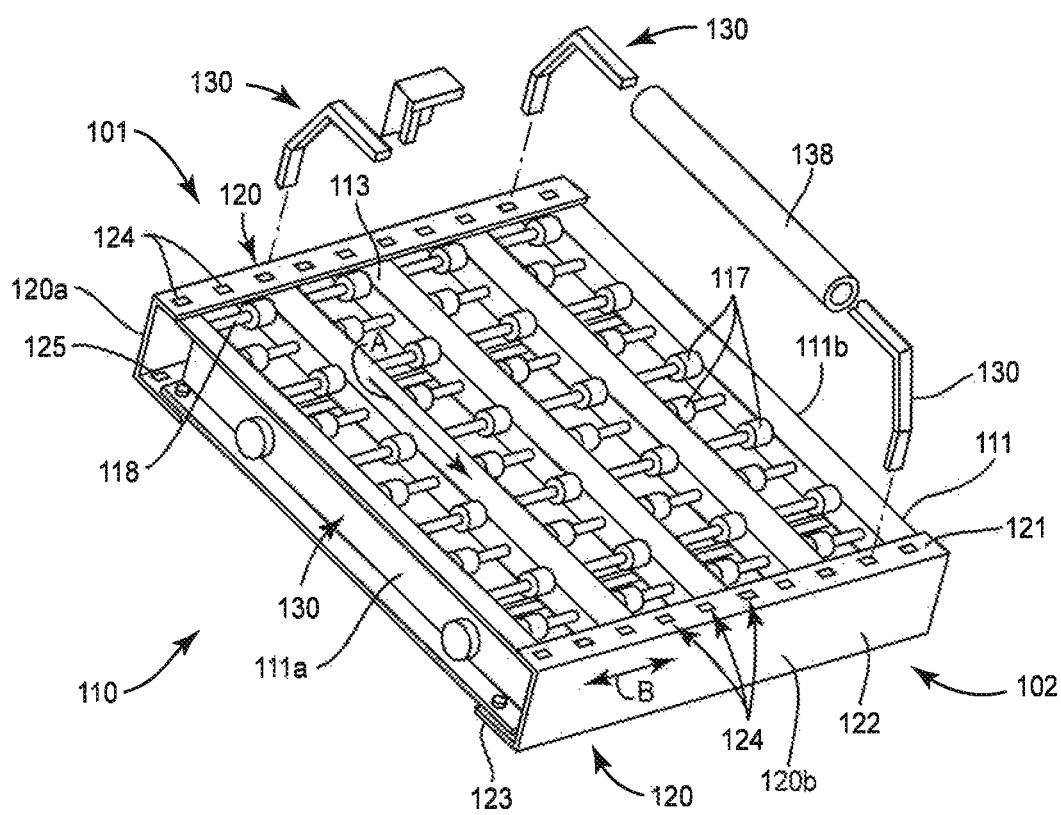
FIG. 3 is a partially exploded perspective view of a section of a container flow bed in accordance with an embodiment of the invention.

Referring also to FIG. 3, bed section 110 includes a pair of side beams 111 and a pair of frame ends 120. A frame end 120a at a loading end of section 110 is higher than frame end 120b, which is downstream in the flow direction of an arrow A. Container flow bed section 110 includes a plurality of rollers 117, rotatably mounted on a plurality of axles 118, which extend laterally, perpendicular to the flow direction, in a lateral direction B. A plurality of support member beams 113 extend lengthwise along flow bed section 110 in the flow direction and provide support for axles 118.

Figure 4:
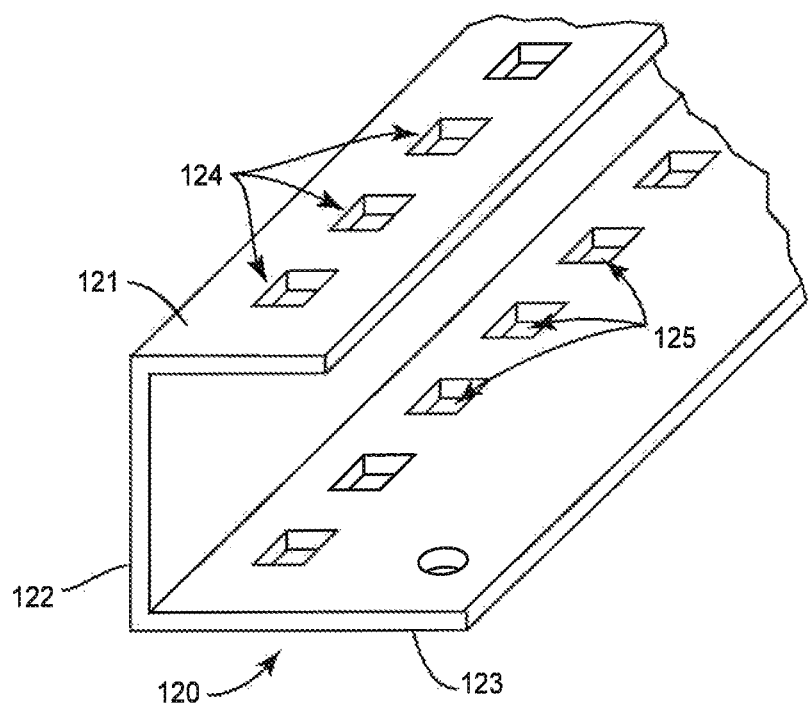
FIG. 4 is a partial perspective view of the flow bed section of FIG. 3.
Figure 6:
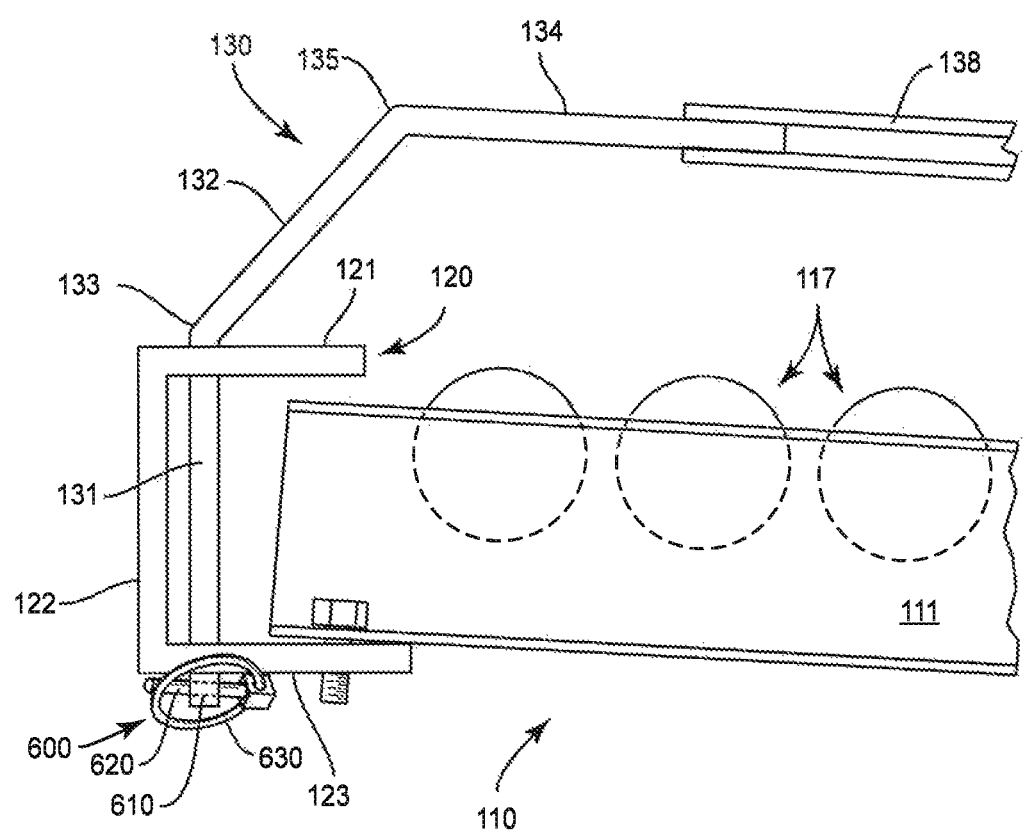
FIG. 6 is a partial side view of the flow bed section of FIG. 3.

Referring now to FIGS. 4 and 6, frame ends 120a and 120b each include a horizontal top portion 121, a vertically descending side portion 122 and a horizontal bottom portion 123. Horizontal top portion 121 and horizontal bottom portion 123 each include a plurality of apertures 124 and 125, respectively, extending in the widthwise lateral direction of arrow B. Each aperture 124 through top portion 121 is vertically aligned with a respective aperture 125 through bottom portion 123.

Figure 7:
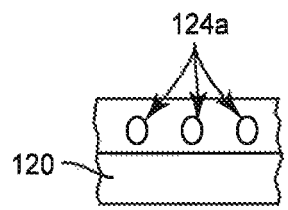
FIG. 7 is a partial top view of a frame end of a container flow bed section in accordance with an embodiment of the invention.
Figure 8:
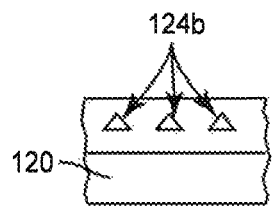
FIG. 8 is a partial top view of a frame end of a container flow bed section in accordance with an embodiment of the invention.
Figure 9:
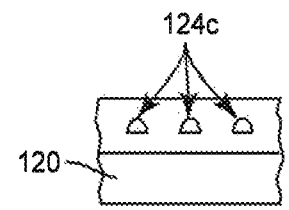
FIG. 9 is a partial top view of a frame end of a container flow bed section in accordance with an embodiment of the invention.

Apertures 124 and 125 are adapted to receive a vertical portion 131 of a lane divider bracket 130, as discussed more fully below and depicted in FIG. 5. Apertures 124 and 125 are preferably shaped so as to prevent rotational movement of lane divider bracket 130 when engaged in said apertures. Any noncircular shape is suitable. A square or other quadrilateral as shown in FIG. 4 is preferred. However, oblong, triangular, hemispherical shapes, as shown in FIGS. 7, 8 and 9 are acceptable. It is preferred that apertures 124 and 125 are of a consistent shape and dimensions, so that lane divider brackets 130 can be inserted into any of the apertures along the horizontal row, for easy adjusting the width of a lane.

Figure 5:
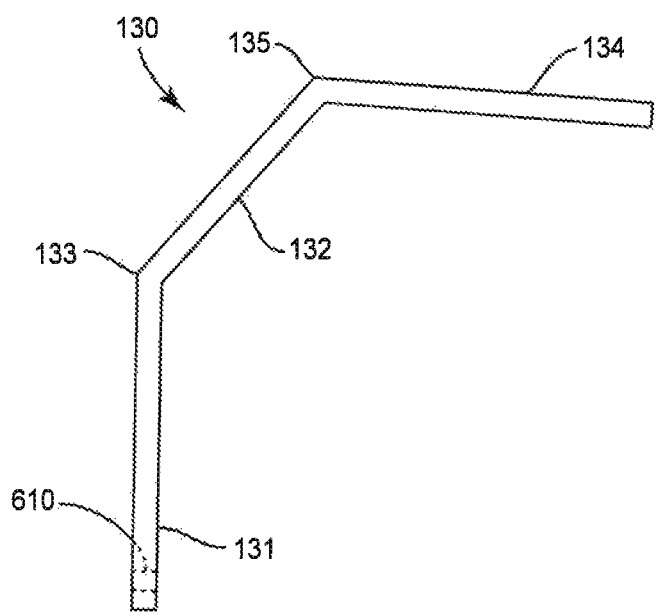
FIG. 5 is a side view of a lane divider bracket in accordance with an embodiment of the invention.

Referring to FIG. 5, a bracket for a lane divider system is shown generally as a lane divider bracket 130. Each lane divider bracket 130 is preferably formed from a single piece solid or hollow metal rod, having a cross section shaped and configured to preferably be snugly and more preferably, also non-rotatably received into apertures 124 and 125. Vertical portion 131 should be long enough to extend from top portion 121, through aperture 124 and extend below aperture 125 in bottom portion 123. Lane divider bracket 130 is shown with a square cross section, but oblong, triangular, hemispherical and other polygons and noncircular cross sections are suitable.

The containers handled in a flow bed in accordance with the invention can be heavy, often weighing 50 pounds or more. Accordingly, the parts of a flow bed must be robust. They should be formed of steel. Lane divider brackets in accordance with the invention can have outer thicknesses of ¼, ⅜, ½, ⅝ inches and thicker. A square shaped bracket having half-inch by half-inch outer dimension is advantageous for many applications.

Lane divider bracket 130 includes distal vertical insertable portion 131, a middle angled portion 132, and a proximal horizontal connecting portion 134. Vertical portion 131 and angled portion 132 meet at corner 133. Angled portion 132 and horizontal portion 134 meet at corner 135. Corner 133 can limit the insertion of lane divider bracket 130 past the selected aperture 124. Angled portion 132 is sized and dimensioned to position horizontal portion 134 at a predetermined desired height above flow bed 100.

It has been determined that as cartons travel in the flow direction, they can often travel along the flow direction without significant lateral shifting. Therefore, in one embodiment of the invention, only one lane divider bracket 130, positioned at loading end 101 is required under certain circumstances. However, when desirable to provide a higher degree of assurance that containers travel in a particular lane, a second lane divider bracket 130 can be positioned at unloading end 102 and a side-by-side pair can define a lane therebetween. Preferably, a loading end lane divider bracket 130 can be connected to an unloading end lane divider bracket 130 with a guide rail 138 to better define the lane.

Guide rails 138 can be solid, but are preferably tubular shaped and preferably fit over horizontal portion 134. Horizontal portion 134 can be solid. It is acceptable to form lane divider bracket 130 as a hollow tube and for guide rail 138 to be inserted into horizontal portion 134. In another embodiment of the invention, guide rail 138 and lane divider bracket 130 can be hooked, latched, bolted or otherwise coupled together. Guide rails 138, especially a side-by-side pair of rails 138, help prevent any lateral (horizontal) shifting of cartons as they travel within a designated lane in the flow direction.

Figure 10:
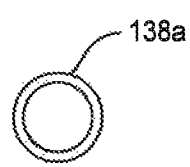
FIG. 10 is a partial end view of a guide rail in accordance with an embodiment of the invention.
Figure 11:
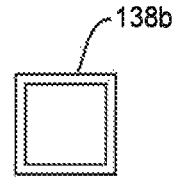
FIG. 11 is a partial end view of an alternate guide rail in accordance with an embodiment of the invention.

Referring to FIGS. 10 and 11, the tubular guide rail can have the circular cross-section of a circular guide rail 138a or a square or other quadrilateral cross-section of a polygon shaped guide rail 138b. Guide rail 138 can have an inner diameter of approximately the outer diameter of bracket 130. The dimensions of rail 138 should match those of bracket 130 to provide a secure fit with low wobble. Common dimensions include a half-inch diameter. Variations of a quarter-inch or more can be acceptable, depending on circumstances.

It has been determined that lane divider brackets 130 and/or guide rails 138 can sometimes become dislodged from the force of the cartons which they are intended to guide. To prevent this from occurring, a bracket retainer 600 can be used to help prevent lane divider bracket 130 from becoming dislodged from apertures 124 or 125. Bracket retainer 600 is inserted through a retainer opening 610 in a lower end (below aperture 124 or 125) of vertical portion 131 and helps prevent lane divider bracket 130 from becoming dislodged out of apertures 124 and/or 125.

Figure 12:
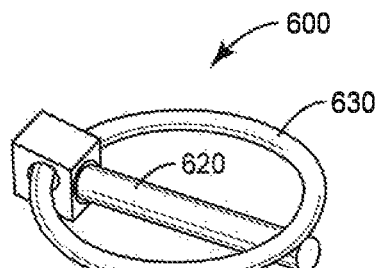
FIG. 12 is a perspective view of a retainer in accordance with an embodiment of the invention.
Figure 13:
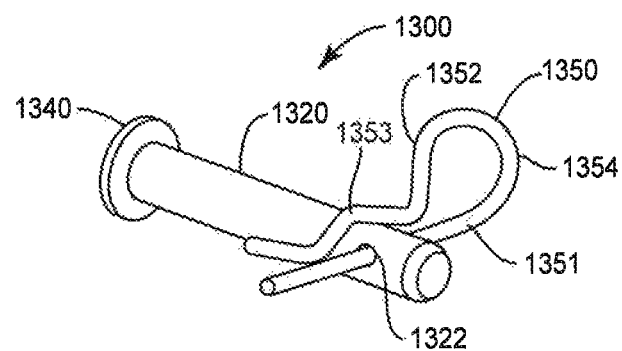
FIG. 13 is a perspective view of a retainer in accordance with an embodiment of the invention.
Figure 14:
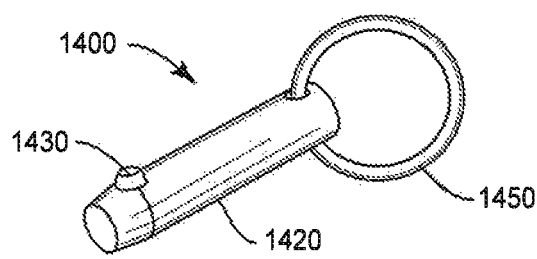
FIG. 14 is a perspective view of a retainer in accordance with an embodiment of the invention.

Referring to FIGS. 12-14, retainer 600 includes a retention pin 620, which is inserted through retainer opening 610. A ring 630 can be used to pull pin 620 from opening 610. Alternate designs for the bracket retainer include a clipped retainer 1300 and a resilient retainer 1400. One end of a retention pin 1320 of retainer 1300 includes a head 1340 sized to prevent pin 1320 from being pulled through retainer opening 610 and a retainer clip 1350 to prevent the other and of pin 1320 from exiting opening 610.

In one embodiment of the invention, such as with a bracket having half-inch outer dimensions, retainer opening 610 can be ⅛, ⅖, ⅜ inches or otherwise in diameter. The retention pin should have an outer dimension to substantially match the inner diameter of the retainer opening.

Retainer clip 1350 is preferably formed with spring metal and can have a "Bobby pin" shape. An insertion arm 1351 of clip 1350 is straight and sized to be inserted through a pin opening 1322 through the end of pin 1320. A retention arm 1352 of clip 1350 includes a security bend 1353 to help retain clip 1350 through opening 1322. A wide gap bend 1354 can assist with the removal and insertion of clip 1350 through opening 1322. The diameter of the gap bend should be over 0.5 inches.

Resilient retainer 1400 includes a retention pin 1420 for insertion through opening 610. One end of pin 1420 includes a resilient depressable projection 1430. Projection 1430 can be beveled or rounded, so that pressing pin 1420 into opening 610 with sufficient force will overcome resistance and cause projection 1430 to retract and permit the insertion of pin 1420 through opening 610. Once projection 1430 exits opening 610, it will again project from the surface of pin 1420 wall and resist the retraction of pin 1420 from opening 610. Resilient retainer 1400 includes a grasping ring 1450 to assist with the removal or insertion of retainer 1400 through opening 610. Ring 145 should have a diameter over 0.5 inches.

Figure 15:
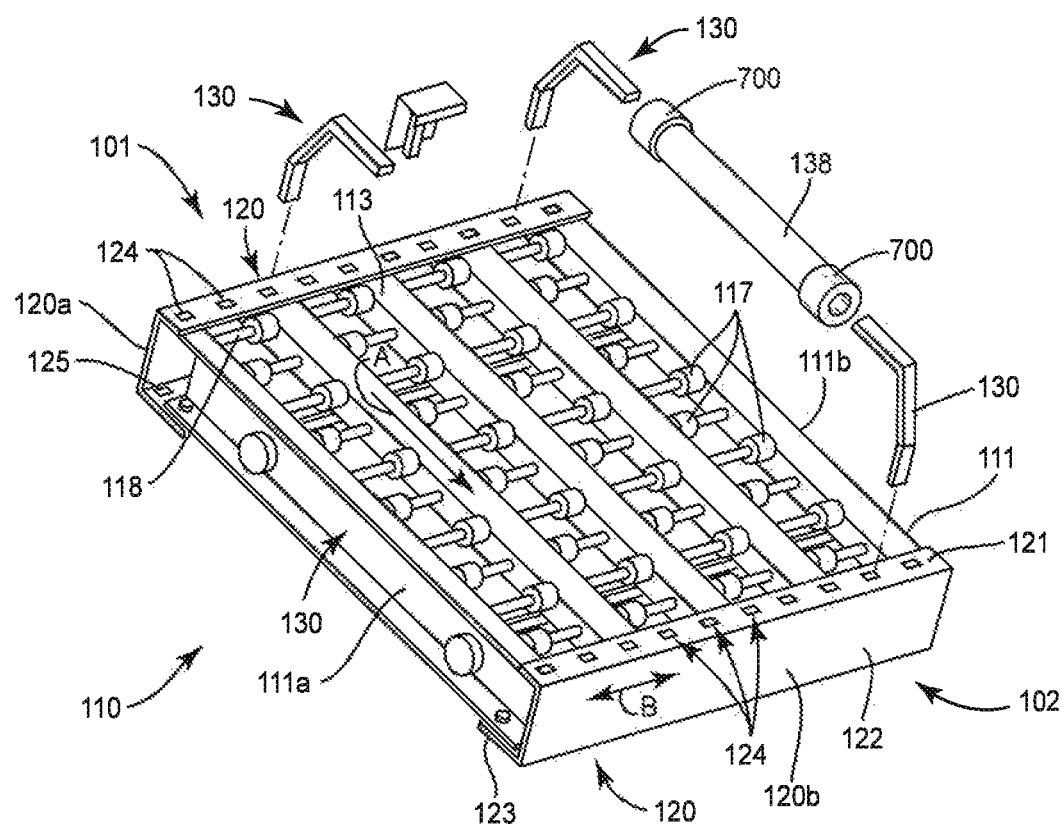
FIG. 15 is a partially exploded perspective view of a section of a container flow bed in accordance with an embodiment of the invention.
Figure 16:
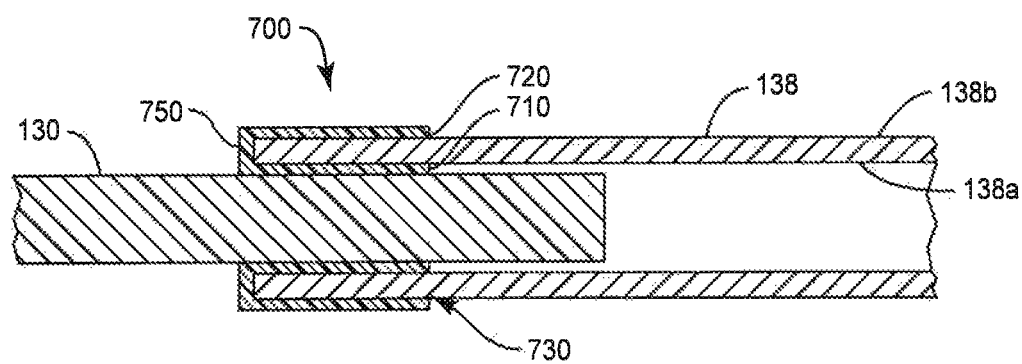
FIG. 16 is a partial cross-sectional view of a bracket and guide rail in accordance with an embodiment of the invention.

It has been determined that enhanced performance can be achieved by increasing the security of the connection between bracket 130 and guide rail 138. Referring to FIGS. 15 and 16, a security sleeve 700 is shown mounted at an end of tubular guide rail 138. Security sleeve 700 includes an inner wall 710 which nests against an inside surface 138a of guide rail tube 138. Security sleeve 700 also includes an outer wall 720, which nests against an outside surface 138b of guide rail 138. A front connecting portion 750 connects inner wall 710 with outer wall 720. A cavity 730 is defined by the space between inner wall 710 and outer wall 720. The end of guide rail tube 138 is inserted into cavity 730, such that security sleeve 700 is mounted on the end of guide rail 138 by inserting each end of guide rail 138 into cavity 730.

Security sleeve 700 is preferably pliable, and formed from flexible, compliant, and/or elastic material. Various plastics, polymers, elastomers and the like are known in the art and are acceptable. Examples of acceptable materials include natural rubber, vinyl, synthetic rubber, nylon, EVA and other materials. The inner dimensions of inner wall 710 can be selected to be slightly smaller than the outer diameter defined of guide rail 138. Thus, lane divider bracket 130 will press against and compress inner wall 710. This will enhance the security of the connection between bracket 130 and guide rail tube 138 and reduce wobble and slippage between the two.

Security sleeve 700 is preferably 0.5 to 3 inches long, more preferably 0.75 to 2.5 inches long. Inner wall 710 is preferably, but not necessarily, the same length as outer wall 720. In one embodiment of the invention, inner wall 710 is longer than outer wall 720. In another embodiment of the invention, outer wall 720 is longer than inner wall 710. Inner wall 710 can be the same thickness as outer wall 720. Inner wall 710 should be thick enough to provide durability and room for compression by the proximal end (horizonal portion 124) of bracket 130. However, inner wall 710 should not be so thick, as to provide a large gap between the outside of horizonal portion 124 and the inside of guide rail tube 138. A thickness of about 0.1 to 2 mm, preferably 0.25 to 0.75 mm is preferred.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A container flow bed, defining a longitudinal flow direction from a proximal loading end to a distal unloading end, comprising:
   a flow bed frame having a first frame edge at a first proximal end of the flow bed and a second frame edge at a distal second end of the flow bed, with a flow section therebetween, the flow section adapted to promote the low friction movement of objects between the first frame edge and the second frame edge in a flow direction;
   a proximal end of a first lane divider bracket engaged with the first frame edge and a distal end of the first lane divider bracket extending towards the second frame edge;
   a first end of a tubular guide rail having an open center portion disposed over the distal end of the first lane divider bracket, the guide rail extending in the flow direction and providing a continuous barrier from the first end to the second end of the flow section, the guide rail adapted to help prevent objects traveling on the flow section from diverging from the flow direction;
   a first retention sleeve formed of compressible material over the first end of the guide rail, the first retention sleeve having an outer wall against an outside surface of the guide rail, an inner wall against an inside surface of the guide rail, and a connecting edge from the outer wall to the inner wall, over a first end edge of the guide rail, the distal end of the first lane divider bracket nested within the inner wall of the first retention sleeve, the inner wall of the first retention sleeve in a state of compression between the distal end of the first lane divider bracket and the first end of the guide rail.

2. The container flow bed of claim 1, comprising a second lane divider bracket releasably engaged with the second frame edge at a distal end of the second lane divider bracket with a proximal end of the second lane divider bracket extending towards the first frame edge;
   a second end of the tubular guide rail having an open center portion disposed over the proximal end of the second lane divider bracket;
   and a second retention sleeve over the second end of the guide rail, the second retention sleeve having an outer wall against the outside surface of the guide rail, an inner wall against the inside surface of the guide rail, and a connecting edge from the outer wall to the inner wall and, over a second end edge of the guide rail, the proximal end of the second lane divider bracket tightly nested within and compressing the inner wall of the second retention sleeve against the inside surface of the second end of the guide rail.

3. The container flow bed of claim 2, wherein the first and the second lane divider brackets have a square cross section with four corners, the guide rail and the first and the second retention sleeves have a circular cross section, and the first and second lane divider brackets are in contact with the first and second retention sleeves at the four corners.

4. The container flow bed of claim 2, wherein the first lane divider bracket has a square cross section and the guide rail and the first retention sleeves have a circular cross section, the first retention sleeve is elastically compressable and is partially compressed by the distal end of the first lane divider bracket.

5. The container flow bed of claim 1, wherein the first lane divider bracket is solid.

6. The container flow bed of claim 1, wherein the first retention sleeve is formed of elastic material and partially compressed by the distal end of the first lane divider bracket.

7. The container flow bed of claim 1, wherein the first lane divider bracket is solid, formed from steel and has an outer dimension of at least about ¼ inch and the guide rail has an inner diameter of at least about ¼ inch.

8. The container flow bed of claim 1, wherein the first lane divider bracket is solid, formed from steel and has an outer dimension of at least about ⅜ inch and the guide rail has an inner diameter of at least about ⅜ inch.

9. The container flow bed of claim 1, wherein the first lane divider bracket is engaged with the first frame edge through a first frame end opening in the first frame edge and the first lane divider bracket and the first frame end opening through which it is engaged are adapted to prevent rotation between the first lane divider bracket and the first frame end and the first lane divider bracket and the guide rail are adapted to resist wobble and slippage therebetween.

10. The container flow bed of claim 9, and comprising a lower frame end opening vertically aligned under the first frame end opening and the first lane divider bracket extends through the first frame end opening and the lower frame end opening, and a retention pin extends through the portion of the first lane divider bracket extending through the lower frame end opening.

11. The container flow bed of claim 1, wherein the first lane divider bracket is solid steel and has a square cross section of about 0.5 inches in width, with the four corners of the distal end of the first lane divider bracket pressing against and compressing the inner wall of the first retention sleeve.

12. A lane divider system extending from a first proximal end to a second distal end, comprising
a first lane divider bracket adapted to securely fit in a first end of a container flow bed at a proximal end thereof;
a distal end of the lane divider bracket inserted into a first proximal end of a tubular guide rail;
a first retention sleeve over the first end of the guide rail, the first retention sleeve having an outer wall against an outside surface of the guide rail, an inner wall against an inside surface of the guide rail, and a connecting edge from the outer wall to the inner wall and over a first end edge of the guide rail, the distal end of the first lane divider bracket nested within and compressing the inner wall of the first retention sleeve.

13. The lane divider system of claim 12, comprising
a second lane divider bracket adapted to releasably engage with a second distal end of the container flow bed at a distal end thereof;
a second distal end of the tubular guide rail having an open center disposed over the proximal end of the second lane divider bracket; and
a second retention sleeve over the second end of the guide rail, the second retention sleeve having an outer wall against the outside surface of the guide rail, an inner wall against the inside surface of the guide rail, and a connecting edge from the outer wall to the inner wall, over a second end edge of the guide rail, the proximal end of the second lane divider bracket tightly nested within and against the inner wall of the second retention sleeve.

14. The lane divider system of claim 13, wherein the first and the second lane divider brackets have a square cross section and the guide rail and the first and the second retention sleeves have a circular cross section.

15. The lane divider system of claim 12, wherein the first lane divider bracket is solid with a square cross section and four corners, with the four corners compressing the inner wall of the first retention sleeve.

16. The lane divider system of claim 12, wherein the first retention sleeve is flexible and partially compressed by the proximal end of the first lane divider bracket.

17. The lane divider system of claim 12, wherein the first lane divider bracket has a square cross section with four corners and the guide rail and the first retention sleeves have a circular cross section, the first retention sleeve is elastically compressible and is partially compressed by the four corners of the proximal end of the first lane divider bracket.

18. The lane divider system of claim 17, wherein the first lane divider bracket is solid, formed from steel and has an outer dimension of at least about ⅜ inch and the guide rail has an inner diameter of at least about ⅜ inch.

19. The lane divider system of claim 12, wherein the first lane divider bracket is solid steel and has a square cross section of about 0.5 inches in width, with the four corners of the proximal end of the first lane divider bracket pressing against and compressing the inner wall of the first retention sleeve.

20. The lane divider system of claim 19, and comprising a lower frame end opening vertically aligned under the first frame end opening and the first lane divider bracket extends through the first frame end opening and the lower frame end opening, and a retention pin extends through the portion of the first lane divider bracket extending through the lower frame end opening.

* * * * *